INVENTOR.
August F. Paris
HIS ATTORNEYS

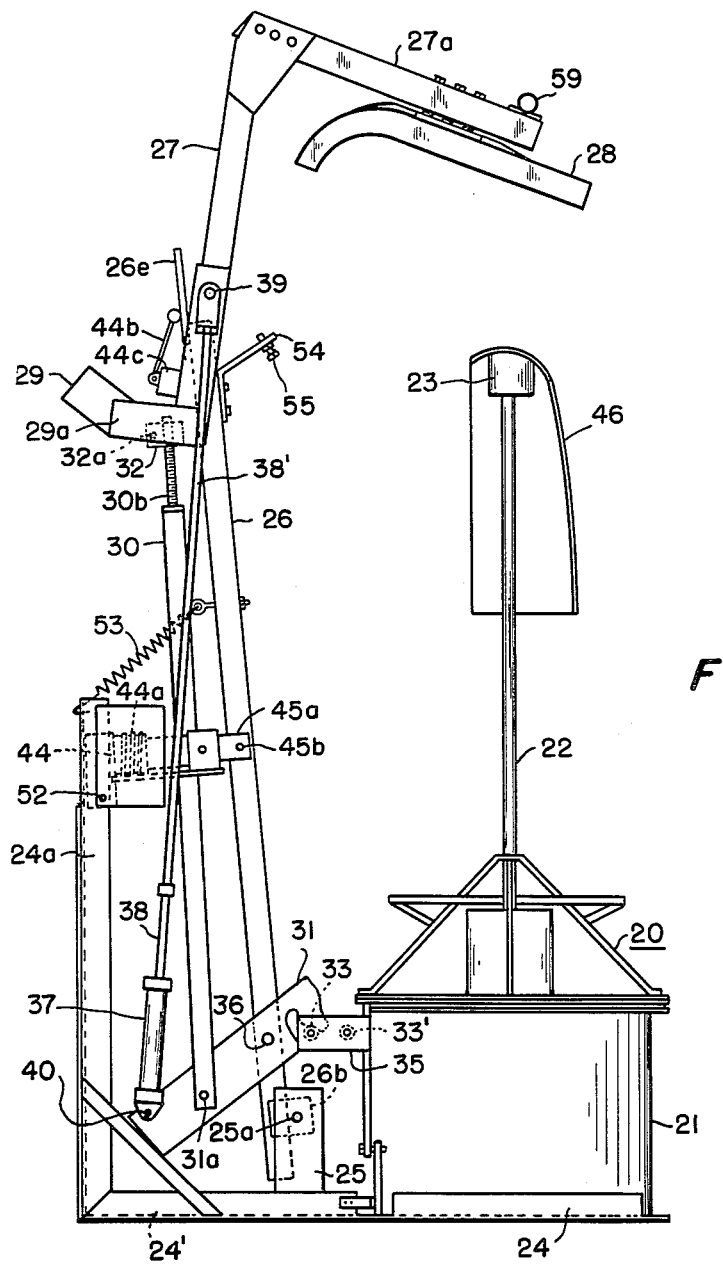
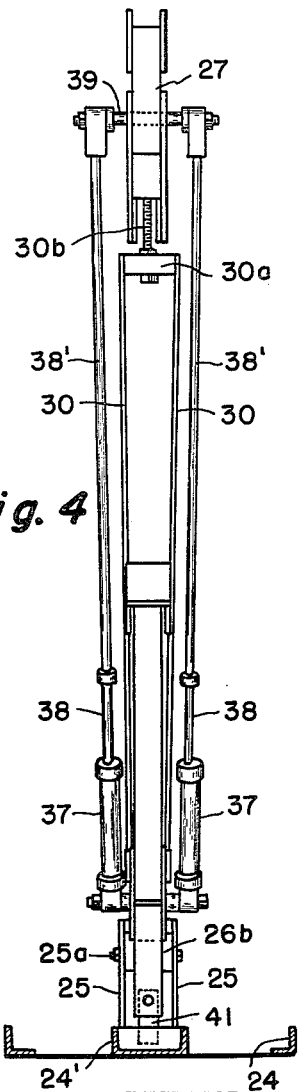
Fig. 3
Fig. 4

Aug. 21, 1962  A. F. PARIS  3,050,220
DRESS SHIRT PRESSING APPARATUS
Filed Aug. 11, 1959  6 Sheets-Sheet 3

INVENTOR.
August F. Paris
BY *Green McCallister & Miller*
HIS ATTORNEYS

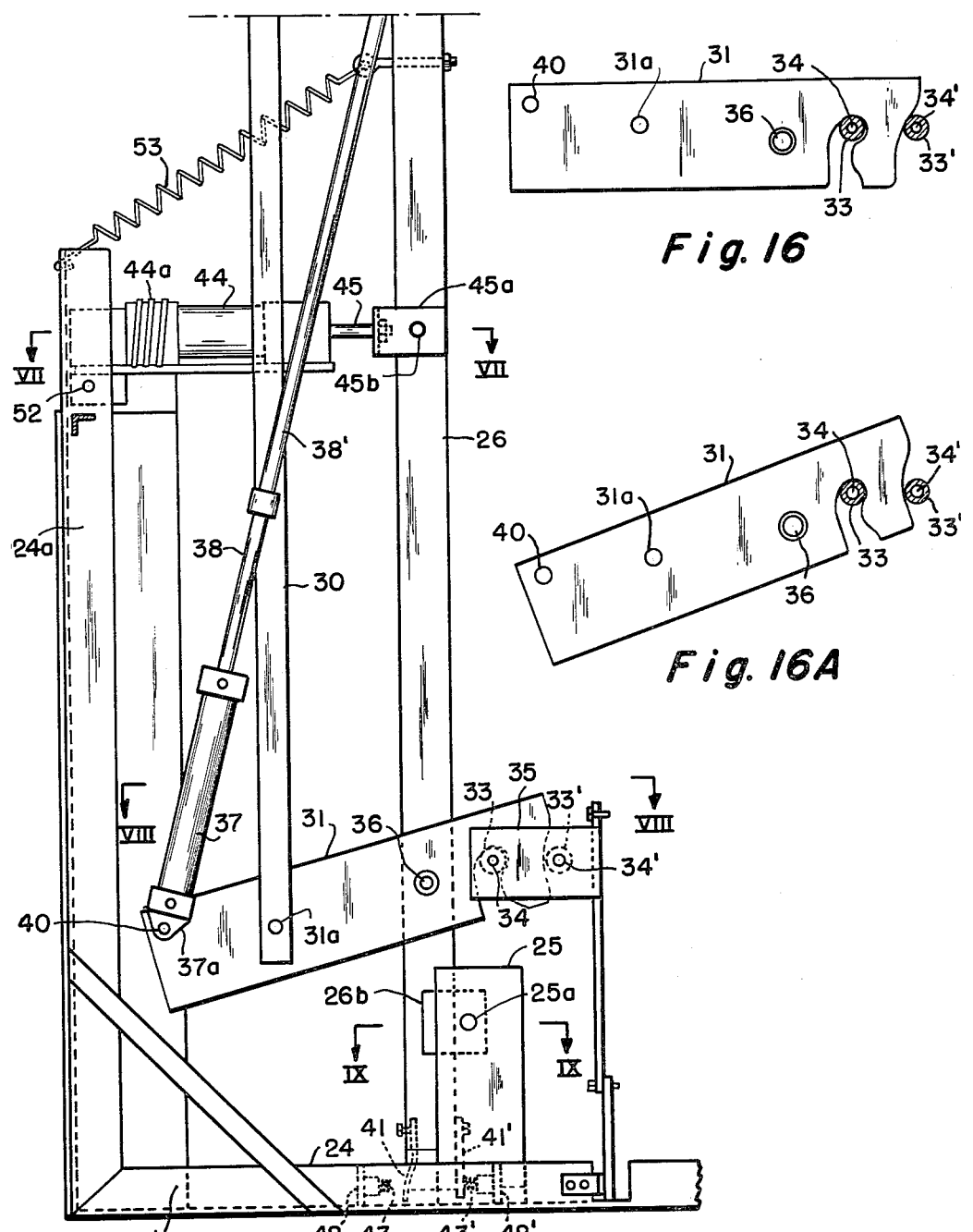

Aug. 21, 1962 A. F. PARIS 3,050,220
DRESS SHIRT PRESSING APPARATUS
Filed Aug. 11, 1959 6 Sheets-Sheet 5

INVENTOR.
August F. Paris
BY *[signature]*

HIS ATTORNEYS

Aug. 21, 1962  A. F. PARIS  3,050,220
DRESS SHIRT PRESSING APPARATUS
Filed Aug. 11, 1959  6 Sheets-Sheet 6
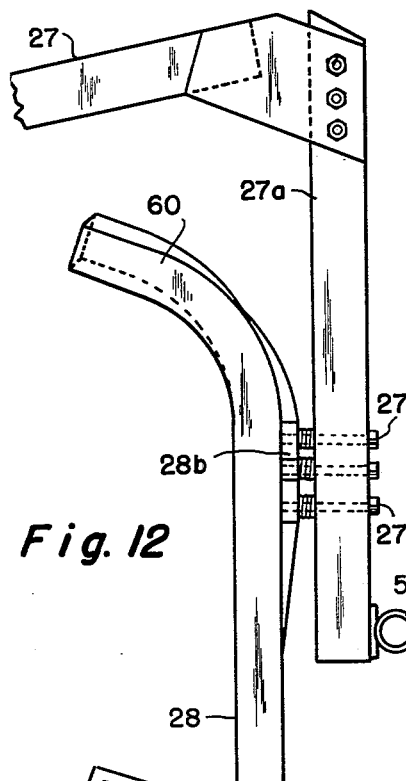
Fig. 12
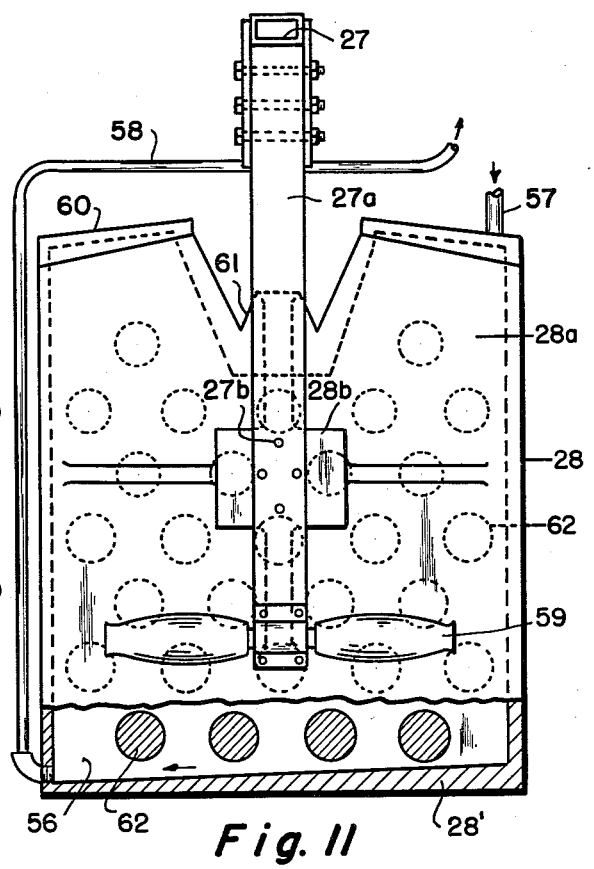
Fig. 11
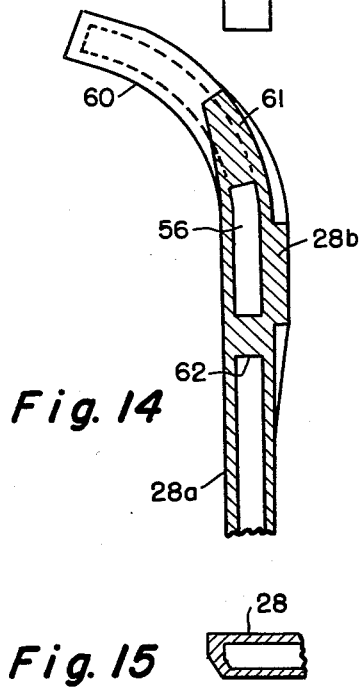
Fig. 14
Fig. 15
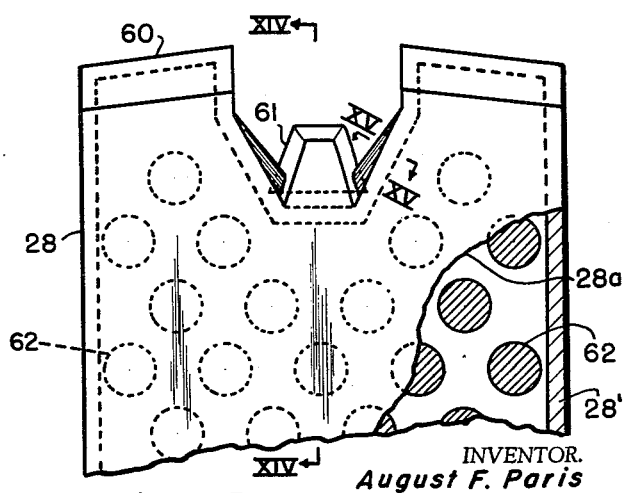
Fig. 13
INVENTOR.
August F. Paris
BY Green McCallister & Miller
HIS ATTORNEYS United States Patent Office 3,050,220
Patented Aug. 21, 1962

3,050,220
DRESS SHIRT PRESSING APPARATUS
August F. Paris, Oak St., Brockway, Pa.
Filed Aug. 11, 1959, Ser. No. 833,088
29 Claims. (Cl. 223—57)

This invention relates to a machine for pressing dress shirts, sport shirts and other similar garments which have specially formed chest portions which are intended to be finished in a way different from the remainder of the garment.

An object of the invention is to produce apparatus which is auxiliary to and is adapted to be used in conjunction with garment processing and pressing apparatus such as disclosed by my Patent No. 2,417,838 of March 25, 1947, i.e., apparatus known as a "Steam Air Finisher."

A further object of the invention is to produce apparatus for supplementing the garment pressing and finishing operations of apparatus such as disclosed by said patent, in that it cooperates with such apparatus in pressing the chest portion of a shirt or similar garment so that it receives a special finish which differs from the finish developed on the remainder of the garment.

A further object is to provide apparatus for specially processing and pressing the chest portion of a shirt or similar garment so as to produce thereon a soft lustre finish devoid of shine and which apparatus is capable of operating in conjunction with pressing apparatus such as disclosed by said patent.

A primary object of the invention is to produce apparatus which combines procedure for pressing the chest portion of a garment by heat and pressure while the remainder of the garment is softly or pliantly finished by subjecting it to the finishing action of steam and air pressure applied to the inner surfaces thereof.

These and other objects which will be made apparent throughout the further description of my invention, are attained by means of apparatus including the structural features illustrated in the accompanying drawings in which FIGURE 1 is a side view of apparatus embodying my invention, i.e., a diagrammatic side view of a garment processing and pressing machine shown in association with a side view of apparatus for pressing the chest portion of a garment (not shown) mounted on such machine.

FIGURE 2 discloses the novel apparatus of FIGURE 1 as viewed from the line II—II of FIGURE 1;

FIGURE 3 is a view similar to FIGURE 1 except that the chest pressing apparatus of my invention as disclosed therein is in the raised or inoperative position;

FIGURE 4 is a front view of the chest pressing apparatus shown in FIGURE 1, as viewed from the right-hand portion of FIGURE 1 with the steam and air pressing machine omitted from the figure;

Figure 1:
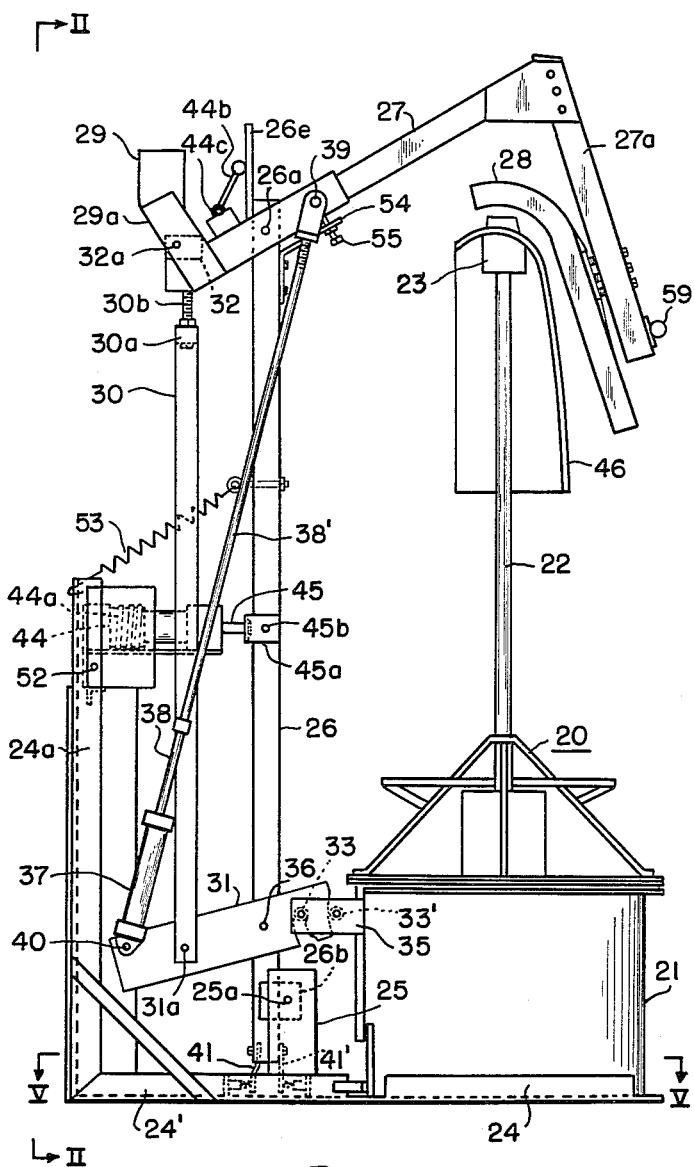
Figure 2:
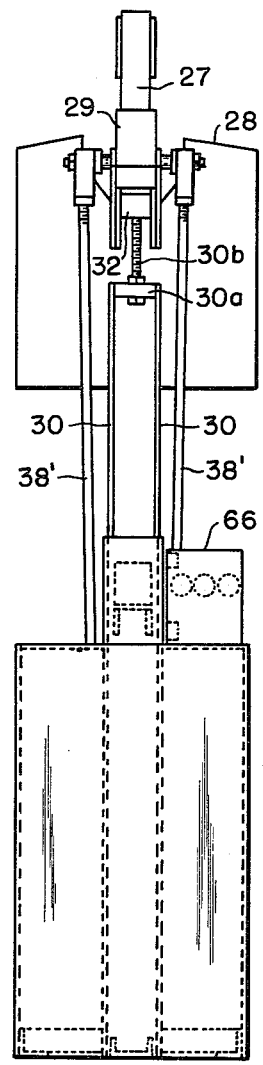
Figure 6A:
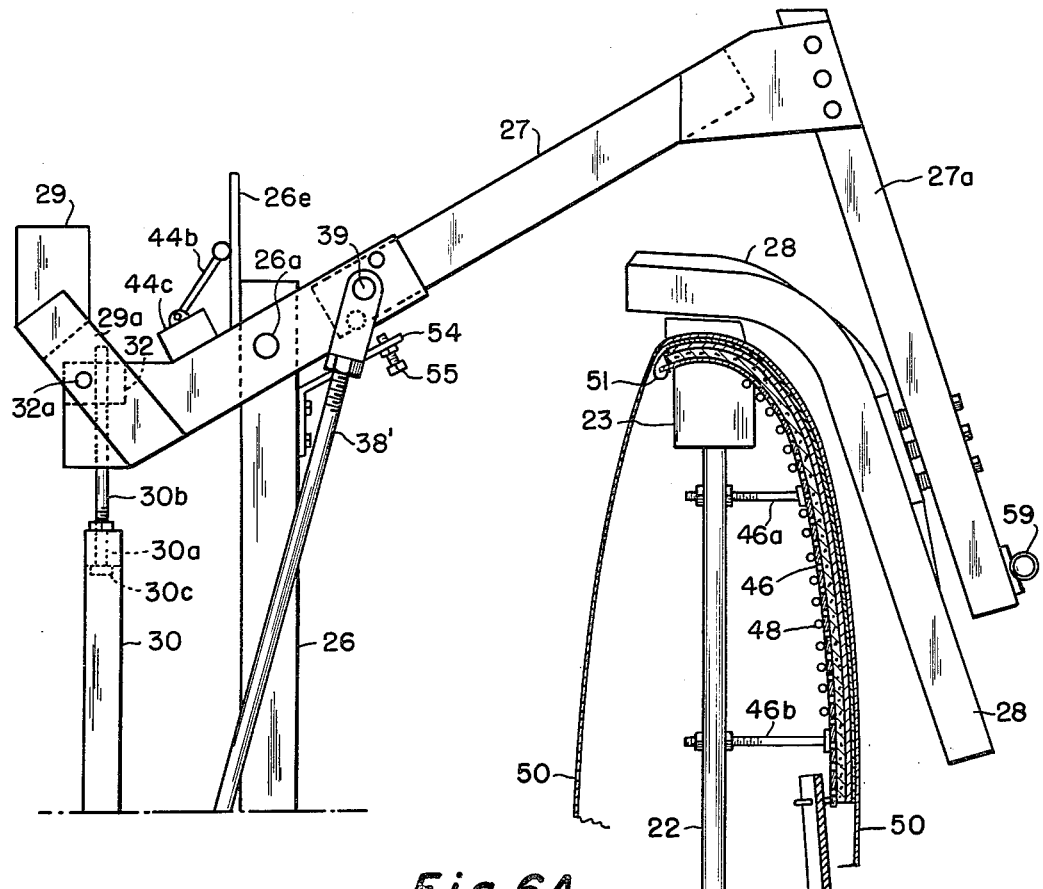
Figure 7:
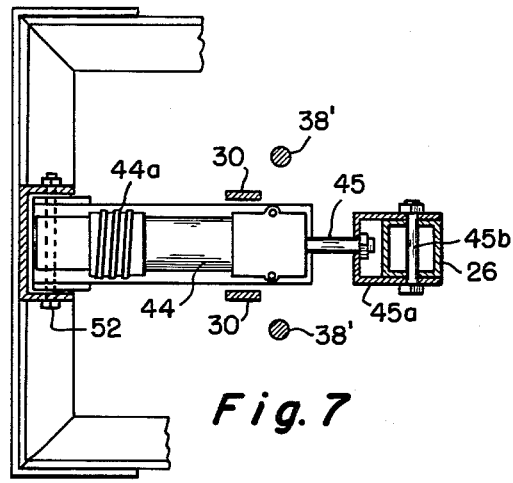
Figure 9:
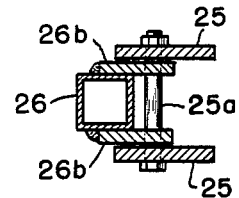
Figure 8:
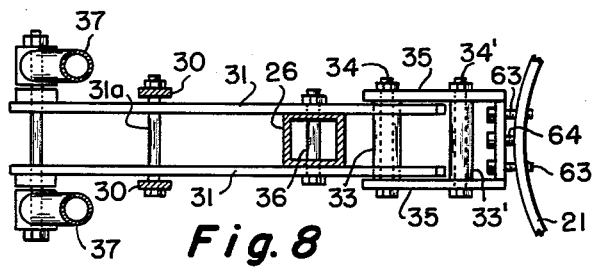
Figure 10:
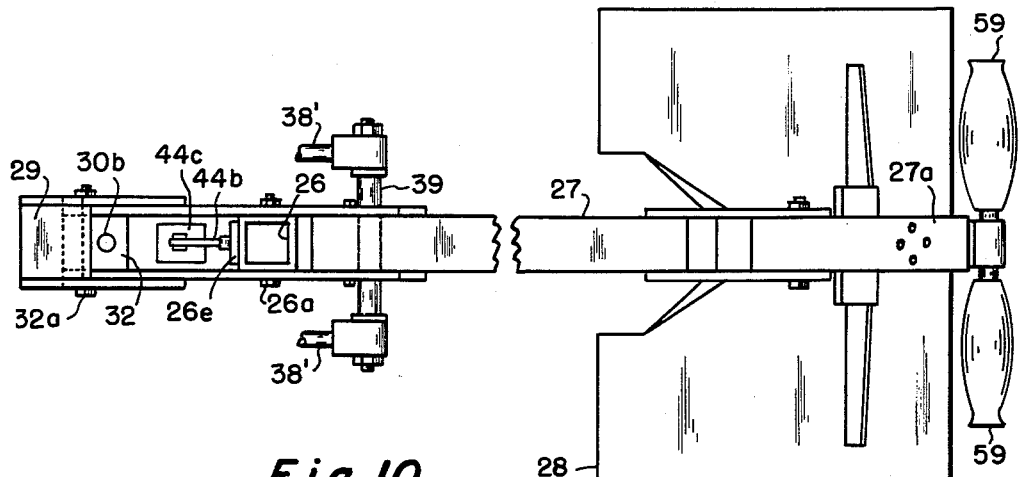

FIGURES 6 and 6A, when combined, constitute an enlarged view of the chest pressing apparatus shown in FIGURE 1 and associated with a fragmental portion of a steam and air garment finishing machine such as the machine disclosed by the previously mentioned patent;

FIGURE 7 is a sectional view taken along the line VII—VII of FIGURE 6;

FIGURE 8 is a sectional view taken along the line VIII—VIII of FIGURE 6;

FIGURE 9 is a sectional view taken along the line IX—IX of FIGURE 6;

FIGURE 10 is a top plan view of a portion of the apparatus shown in FIGURE 6A;

FIGURE 11 is a diagrammatic front view of apparatus shown in FIGURE 12 and disclosing a chest pressing device forming a part of my invention and shown partially in elevation and partially in section;

FIGURE 12 is a fragmental side elevation of apparatus shown in FIGURE 11;

FIGURE 13 is a fragmental view (shown partially in elevation, and partially in section) of the chest pressing apparatus shown in FIGURE 11;

FIGURE 14 is a sectional view along the line XIV—XIV of FIGURE 13;

FIGURE 15 is a fragmental sectional view taken on the line XV—XV of FIGURE 13; and FIGURES 16 and 16A are diagrammatic views of different operating positions occupied by a cam constituting a detail of my invention.

As noted, apparatus embodying my invention is adapted to produce a special finish on the chest portions of men's shirts and similar garments and is capable of being employed with apparatus generally similar to apparatus disclosed by said patent and is capable of cooperating therewith in the operation of processing and finishing garments of the type above mentioned.

A characteristic feature of the present invention is that it involves apparatus and procedure for specially processing the chest portions of a garment such as a shirt while it is located on and is being processed by finishing apparatus such as disclosed by said patent, i.e., a steam and air garment pressing machine. In such machines the garment to be pressed is supported on a neck and shoulder support such as is disclosed by the above mentioned patent and also by my Patent No. 2,841,315 of July 1, 1958.

The pressing machine of my present invention, however, differs from known and presently used machines in that it includes, as a feature of my invention, an apertured chest and shoulder support plate which is adapted to be adjusted forwardly and rearwardly relatively to the shoulder supports of the machine and is also provided with a separate heating coil located adjacent to it. The chest and shoulder support plate is also so formed and located that it cooperates with a new and improved pressing plate in applying both heat and pressure to the chest and at least a part of the shoulder portion of a garment located on the pressing machine. The pressing plate forms a part of a pressing device which is separately supplied with heating medium such as steam and is movable into and out of cooperative relationship with the chest and shoulder support plate, which is hereafter referred to as chest plate 46.

Referring to the drawings, a pressing machine 20 is diagrammatically illustrated in FIGURES 1 and 3 and as there shown includes a base portion 21, a central post 22 projecting upwardly from the base portion and neck and shoulder support 23 mounted on the post above and spaced from the base portion 21. The machine is shown as supported on a channel 24 which is a part of the base of the machine. An extension 24' of the channel is shown as the support for apparatus which in turn supports a pressing device 28. The device 28 cooperates with the pressing machine 20 and particularly the chest plate 46.

As disclosed in FIGURES 1, 6, and 6A, the above mentioned apparatus includes two, spaced, support plates 25 which are rigidly secured to the channel extension 24' and constitute a support for a pivot pin 25a on which an upright or mast 26 is pivotally supported. The pin 25a is horizontally located, is offset from the mast 26 and extends through two bearing plates 26b which are secured to opposite sides of the mast 26 and cooperate with the pin 25a in pivotally supporting the mast on the plates 25 (see FIGURE 6). An arm 27 is pivotally secured to the upper end of the mast 26 on pin 26a and is provided with an extension arm 27a which extends downwardly and at an angle to the support 27 and supports chest pressing device 28 disclosed also in FIGURES 11 and 13 as including a pressing plate 28a.

The arm 27 is pivotally connected to the mast 26 by pivot pin 26a. The end of the arm 27 adjacent the pivot pin 26a is provided with a counterweight 29 located between and secured to spaced parallel plates 29a. Each of the plates 29a is secured to the end of the arm 27 at a point close to but spaced from the pivot pin 26a.

The apparatus which includes the mast 26 also includes two upwardly extending bars which may be termed floating guide bars 30. They are located in parallel spaced relationship with their upper ends secured to a spacer block 30a (see also FIGURE 6A). The lower end of each bar 30 is pivotally secured to a separate one of a pair of spaced cam plates 31 by means of a pivot pin 31a. The spacer block 30a is shown secured to the arm 27 by means of an adjusting screw 30b and a screw block 32 which is located between the plates 29a and is secured to those plates by a pivot pin 32a on which the screw block 32 is pivotally supported. The adjusting screw 30b is threaded through the block 32 so as to adjust the position of the arm 27 with relation to the mast 26 and the bars 30. The head 30c of the screw 30b bears against the lower face of the spacer block 30a.

One of the cam plates 31 is shown in side elevation in FIGURE 16 in connection with two spaced cam-engaging rolls 33 and 33', each of which is mounted on a separate one of the shafts 34 and 34'. These shafts extend through and are secured to two spaced plates 35 which are located in parallel relationship and, as shown in FIGURES 1, 3 and 8 are rigidly secured to the base portion 21 of the garment pressing machine generally indicated at 20 in FIGURE 1. Both of the cam plates 31 are pivotally secured to the mast 26 by means of a pivot pin 36 and each plate pivots around that pin. Each of the cam plates 31 is also operatively secured to the support arm 27 by means of a separate air cylinder 37, a separate piston rod 38, an extension rod 38', a pivot pin 39 which extends through arm 27 and a pivot pin 40 which extends through both the cam plates 31 and brackets 37a, each of which is formed on the lower head of a separate one of the cylinders 37 (see FIGURES 6 and 6A). With this arrangement the support arm 27 pivots around the pin 26a and the weight 29 counterbalances the weight of the projecting end of the arm 27, the extension arm 27a and the chest pressing device 28.

Figure 5:
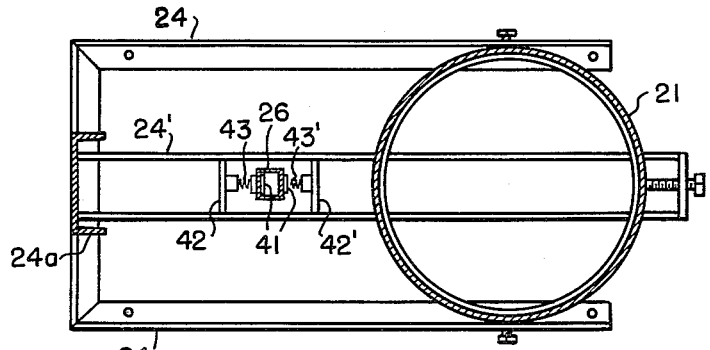
FIGURE 5 is a sectional view taken along the line V—V of FIGURE 1.

The lower end of the mast 26 is provided with adjustably mounted, spaced prongs 41 which are secured to opposed faces of the mast 26 and which project downwardly from the end thereof to a point adjacent the base portion of the channel member 24'. As shown in FIGURES 5 and 6, two plates 42 and 42' extend transversely across the channel member 24' between the flanges thereof and each plate provides a support for one of two coiled springs 43 and 43'. The plates are spaced longitudinally of the member 24' and the springs are also located in spaced relationship and each extends into the path of one or the other of the two prongs 41 as the mast tilts about the pin 25a as the device 28 is moved toward and away from the breast plate 46. Each spring 43 and 43' acts as a buffer in checking the movement of the mast as it swings in one direction or the other.

The tilting of the mast 26 is to some extent controlled by a pressure cylinder 44, the piston rod 45 of which is pivotally secured to the mast 26 by means of a U-shaped member 45a which partially embraces the mast and is pivotally secured to it by a pivot pin 45b.

As shown in FIGURE 6A, the breast plate 46 extends from the shoulder support 23 of the machine 20 and is perforated throughout its entire lower portion. The breast plate is also engaged and held in position with relation to the central post 22 and the shoulder support 23, by means of adjusting screws 46a and 46b. Each of these screws is threaded through a separate bracket mounted on the central post 22 and the two screws are so arranged that they are capable of moving the plate 46 forwardly and rearwardly for the purpose of adjusting the plate 46 to accommodate garments of different chest size and/or shape which may be supported on the shoulder support 23 of the pressing machine.

As shown in FIGURE 6A, the breast plate 46 is backed up by separate heating means which preferably consists of loops of copper pipe 48 located behind and closely adjacent to the chest plate and to which a separate supply of heating medium such as steam is delivered. It will be understood that the loops of pipe 48 are so mounted relatively to the plate 46 that they move with that plate as the plate is moved to different positions by the adjusting screws 46a and 46b.

The opposite side of the plate 46 is covered with padding 49 which is located between the plate and a nylon bag or form 50. The form 50 encloses the padding, is suspended from the shoulder support 23 and its lower edge encircles the upper edge of the base portion 21 to which it is secured. (The garment being processed is supported on the form.) As disclosed in FIGURE 6A, the padding is secured to the upper rear edge of the breast plate 46 by means of hooks 51. The padding is preferably preliminarily formed so that it fits the contour of the forward face of the breast plate, including shoulder supporting portions thereof.

Referring again to the portion of the apparatus for pressing the chest portion of a garment, viz., the device 28, and also to the tilting of the mast 26 during the operation of moving the device 28 into garment-pressing relationship with the chest plate 46, it is noted that the pressure cylinder 44 is pivotally secured to a support member 24a of the guard frame by means of a pivot pin 52 so that it (the cylinder 44) is capable of moving to different positions around the pin 52 as indicated in FIGURE 3. Such movements take place during tilting movements of the mast 26 about its support pin 25a. As shown in FIGURES 1, 3, and 6, a coiled spring 53 is located between one of the uprights 24a and the mast 26 and is so positioned and tensioned that it, in cooperation with the piston in the cylinder 44, tends to tilt the mast from the position shown in FIGURES 1 and 6 to the inclined position shown in FIGURE 3. As will be described later, the cylinder 44 and its piston serve to move the pressing device 28 toward and away from pressing position with relation to the chest plate 46. However, a solenoid 44a which is diagrammatically shown as extending around the cylinder 44, controls the operation of the cylinder 44 and its operating piston by controlling the delivery of compressed air to and from the cylinder. The cylinder 44 is effective for a short time only and this occurs during the last few seconds of the machine cycle during each garment-pressing operation. As a result, the spring 53 cooperates in completing the tilting of the mast 26 and in holding the chest pressing device 28 in a garment-pressing position.

As shown in FIGURES 1 and 6A, the mast 26 may be provided with a bracket 54, which is fitted with an adjusting bolt 55 extending through the free end thereof. By engaging the support arm 27 as it swings downwardly about the pin 26a, the bolt fixes the lowermost position of the pressing device 28 as it moves toward the breast plate 46. However, the bracket 54 and bolt 55 are not essential parts of the apparatus since the proper positioning of the device 28 may be otherwise obtained.

It will be apparent that when the support arm 27 arrives at its lowermost position an actuating arm 44b of a control switch 44c is engaged by an extension 26e of the mast 26 and closes the switch. This results in the delivery of actuating current to the solenoid 44a, which in turn actuates the inlet valve of cylinder 44 to deliver motive fluid to the cylinder and thereby actuate the piston thereof to tilt the mast 26 and move the device 28 into pressing engagement with the breast plate 46. When the operating pressure in the cylinder 44 tilts the mast 26, the spring 53 cooperates in holding the device 28 in garment pressing engagement with the breast plate.

As disclosed in FIGURES 12–14, the pressing device 28 is rigidly secured to the extension arm 27a by bolts 27b which extend through the arm 27a and are threaded into a lug 28b formed on the rear face of the casing 28' of the device. Each screw is surrounded by a short coiled spring located between the lug 28b and the extension arm 27a. The casing 28' in conjunction with the pressing plate 28a encloses a heating chamber 56. As shown in FIGURE 11, heating fluid, such as steam, is delivered to the chamber 56 through an inlet pipe 57 and from which heating fluid and condensation is discharged from the chamber through a passage 58. The device 28 and the breast plate 46 are preferably heated to about 300° F.

As shown in FIGURES 11 and 12, the end of the extension arm 27a is provided with handle portions 59 so arranged that the chest pressing device may be forced by hand into pressing engagement with the chest portion of a garment located on the pressing machine. As disclosed in FIGURES 12–14, the apparatus 28 is shaped to conform to the contour of the breast plate 46 and the upper edge thereof is recessed to form shoulder extensions 60 which extend on opposite sides of the neck portion of the pressing machine and are located on opposite sides of a central projection 61 which extends upwardly from the chest-engaging portion of the apparatus toward the neck portion of the pressing machine. As disclosed in the drawings, the inner face of the casing of the device 28 is provided with spaced lugs 62 which project upwardly through chamber 56 and constitute supports for the pressing plate 28a.

As a preliminary to outlining the operation of the apparatus, it is noted that the end of each cam plate 31 adjacent to the pivot pin 36 is notched to receive the cam-engaging roller 33. The edges of the notch in each plate 31 are in effect cam surfaces which cooperate with the roller 33, shifting the position of the plates as they swing about pivot pin 36. The adjacent end of each plate 31 is also curved to form a cam-like edge which engages and cooperates with the cam roller 33' in checking the pivotal motion of the cam plates about the pin 36 and thereby in effect locking the cam plate in a horizontal position and holding the pressing device 28 in a garment-pressing position. FIGURE 8 discloses that the U-shaped member includes in its make-up the plates 35 between which the cam rollers 33 and 33' are mounted and that the member is secured to the base portion 21 of the pressing machine, by two bolts 63 and an intermediate bolt 64 which is, in effect, a set or positioning screw. The arrangement of these bolts is such that the positions of the plates 35 and, consequently, of the cam rollers 33 and 33' are capable of a slight forward and back adjustment with relation to the base portion of the pressing machine. This provides means for adjusting the pressure of the device 28 with relation to the breast plate 46 when the support arm 27 is moved to its lowermost position.

The two air cylinders 37, the pistons of which are operatively coupled to the piston rods 38, are preferably controlled by air valves which are preferably electro-pneumatically controlled by the timer 66. When fluid pressure is delivered to the lower ends of the cylinders 37, the piston rods 38 are extended, thereby moving the support arm 27 and the pressing device 28 to the uppermost position as shown in FIGURE 3. The piston rods 38 and their extensions 38' also cause the movements of the cylinder 37 such that the cam plates 31 are moved to a position such as shown in FIGURE 3, in which the cam roller 33 is the only one in engagement with the cam plates. Under such conditions the mast 26 is also tilted to the position shown in FIGURE 3. On reversing the action of the floating cylinders 37, the piston rods 38 are retracted thus moving the support arm 27 downwardly from the position shown in FIGURE 3 and the pressing device 28 into pressing engagement with the chest and shoulder portion of the garment located on the pressing machine. During this movement of the support arm 27, the arm 44b of control switch 44c moves to open the switch and shut off the current to the solenoid 44a. This cuts off the delivery of compressed air to the cylinder 44 so that the mast 26 is moved back to the upright position as shown in FIGURES 6 and 6A.

As the cam plates 31 ride the rollers 33 and 33', from the position shown in FIGURE 3 the pressing device 28 is moving toward the garment-pressing position, and contact of the plates 31 with the roller 33' will shift the position of the plates so as to again tilt the mast 26 through a small angle to the left of its position as shown in FIGURES 1, 6, and 6A, thus forcing the pressing device 28 against the padding of the chest plate 46. The downward movement of the support arm 27 will, through the agency of apparatus not shown, again energize the cylinder 44 so that it retracts the piston rod 45 and contributes to the tilting of the mast 26, thereby drawing the pressing device 28 firmly against the padded chest plate 46 and thus producing sufficient pressure on the chest portion of the garment being processed to obtain the desired finish on that portion of the garment. In connection with the special processing of the chest portions of garments, it is noted that as a preliminary to the pressing of such garments the chest portions thereof are preferably sprayed with a light mist of water, or better, a light mist of dilute water solution of starch or sizing material. This preliminary treatment will produce a finish such as is normally desired on the chest portion of dress shirts or similar garments.

The pressing machine illustrated is provided with a timing mechanism, indicated as included in the timer mechanism 66 (FIGURE 3) and employed for timing the application of processing steam and heated air to the interior of garments mounted on the machine. The mechanism also includes means for timing the operation of the motor (not shown) which drives the propeller of the air compressor.

The operation of the apparatus here disclosed in connection with a steam and air garment processing machine such as the machine 20, is briefly as follows:

As the support arm 27 moves from a position such as shown in FIGURE 3, to its lowermost position, the actuating arm 44b of the switch 44c follows the movement of the extension 26e of the mast 26 and closes the switch to deliver current to the solenoid 44a which, in response to the current so delivered, opens the inlet valve of the cylinder 44 and thus delivers compressed air to that cylinder and actuates the piston thereof to move the mast 26 to a tilted position such that the chest pressing device 28 is moved to and is held in garment-pressing position with relation to the breast plate 48 and the padding thereof. This movement is contributed to by spring 53 and completes the tilting of the mast which was initiated by the cam plates 31 as they move to the position indicated in FIGURE 6 with relation to the cam engaging rollers 33 and 33'. As the cylinder 44 is motivated by the delivery of compressed air to it, the timing mechanism 66 starts the motor forming a part of the garment-processing machine, and, consequently, the fan driven by that motor delivers air upwardly through the base portion 21 of the processing machine 20 and into the garment suspended from the shoulder portion 23 of the processing machine. The operation of the motor and the fan driven by it, is timed by the timing mechanism 66 and as that mechanism stops the motor and the air delivered into and through the garment, the switch 44c is actuated to cut off the supply of current to the valve-actuating solenoid 44a and thereby shuts off the delivery of compressed air to the cylinder 44. The timing mechanism also occasions the delivery of actuating air to the lower ends of the cylinders 37 with the result that the piston rods 38 and the extensions 38' thereof move to lift the support arm 27 to its uppermost position. This movement of the arm 27 lifts the pressing device 28 to its uppermost position as shown in FIG. 3. In this position of the support arm 27 the spring 53 contributes to the action of the cylinder 44 and retains the mast 26 in the tilted position and the arm 27 and the device 28 in the raised position. As the motor which actuates the fan stops and the device 28 reaches the raised position, the timing mechanism 66 resets automatically and the operating mechanisms of the apparatus illustrated and of the garment-processing machine, are held ready for the next processing operation.

The next processing operation may be started manually by actuating a switch or hand valve which will immediately deliver actuating air pressure to the upper ends of the air cylinders 37 and thus reverse the operation thereof and cause the lowering of the arm 27 and the moving of the device 28 to a position somewhat as indicated in FIGURE 6A. During this movement the mast 26 moves to the upright position as disclosed in FIGURE 1 and FIGURES 6 and 6A, thus causing the plates 31 to contact with the roller 34' and to again tilt the mast 26 through a short angle to the left of its position, shown in FIGURES 1 and 6A. The operation of the switch actuating arm 44b which contacts and moves with the extension 26e of the mast, closes the switch 44c and delivers current to the solenoid 44a, thus again energizing the cylinder 44 and its piston to tilt the mast to the left as shown in FIGURE 6 and 6A and thus move the pressing device 28 into pressing contact with the breast portion of the garment located on the machine 20. During this position of the pressing device 28 steam and air are delivered to the interior of the garment through the base portion 21 of the machine 20. As the timer 66 moves to complete the delivery of steam and air to the garment being processed, the switch 44c moves to shut off the delivery of current to the solenoid 44a and thus cease the delivery of air to the cylinder 44. As the solenoid closes the inlet port of the cylinder 44, the air is exhausted from that cylinder and the delivery of air pressure to the lower ends of the cylinders 37 move the support arm 27 and the pressing device 28 to the uppermost position as shown in FIGURE 3, thus completing a garment-processing cycle of the machine 20.

While I have illustrated but one embodiment of my invention, it will be apparent to those skilled in the art that various changes, additions, modifications, and omissions may be made in the apparatus illustrated without departing from the spirit and scope of the invention as defined by the appended claims.

What I claim is:

1. A garment pressing machine including as a part thereof a garment support; a perforated breast plate; upwardly extending rearwardly curved shoulder extensions secured to and spaced along the upper edge of said plate, in combination with a pressing device movable toward and away from said plate and said extensions; a support mechanism for said device including an upwardly extending, pivotally supported mast; a support arm secured to said device and pivotally connected to said mast; a floating guide bar pivotally secured to said arm; a cam plate pivotally secured to said mast and said bar; spaced cam rollers; and means pivotally connected to said arm and said cam plate for moving said arm about its pivotal connection with said mast and for moving said cam plate to different positions relatively to said rollers.

2. In a garment pressing machine, a base portion; a garment support secured to and located in spaced relationship above said base portion; a breast plate secured to said support; and curved shoulder extensions spaced along the upper edge of said breast plate and secured thereto, in combination with a pressing device; a support arm secured to said device; a pivotally supported upwardly extending mast pivotally secured to said base portion and said arm; a floating guide bar pivotally secured to said arm; a cam plate pivotally secured to said mast and said guide bar; horizontally spaced cam rollers; and means pivotally connected to said cam plate and said arm for swinging said arm about its pivotal connection with said mast and for moving said cam plate to different positions relatively to said cam rollers and thereby shifting the position of said mast, said arm and said bar.

3. In a garment pressing machine, a base; a garment support rigidly secured to and projecting above said base; a breast plate secured to said support above said base and having upwardly curved shoulder support extensions secured to and located in spaced relation along the upper portion of said plate; a combined chest and shoulder pressing device having a pressing surface substantially congruent the shape of the pressing surface of said breast plate and said shoulder support extensions; support means for said device including an upwardly extending mast pivotally mounted on said base; a support arm for said device; means for pivotally mounting said arm on said mast at a point remote from said base; and means for moving said arm to different angular positions relatively to said mast and for tilting said mast relatively to said base to thereby move said device into garment pressing position relatively to said breast plate and said shoulder support extensions.

4. In a garment pressing machine a base; a garment support secured to and extending above said base; a breast plate secured to said support above said base and having upwardly extending, rearwardly curved shoulder support means secured to the upper portion of said breast plate; in combination with a pressing device movable toward and away from said plate and said shoulder support means; a mast pivotally supported on said base; a support arm secured to said device and pivotally secured to said mast; and separate means for moving said arm relatively to said mast and for tilting said mast relatively to said base to thereby move said device into garment pressing relationship with said plate and said shoulder support means.

5. In a garment pressing machine, a base; a garment support secured to and extending above said base; a breast plate mounted on said support and having upwardly and rearwardly curved shoulder support means secured to the upper portion of said breast plate; in combination with a pressing device, a mast pivotally secured to said base and extending upwardly therefrom; a support arm; a pivot support for said arm secured to said mast at a point remote from said base; and means secured to said arm and to said mast for swinging said arm about said pivot support and for tilting said mast relatively to said base and thereby moving said device into garment pressing relationship with said breast plate and said shoulder support means.

6. In combination in a garment pressing machine, a base; a post rigidly secured to and extending above said base; a breast plate secured to said post above said base and having upwardly and rearwardly extending shoulder support portions secured thereto along the upper portion thereof; a chest and shoulder pressing device; support means for said device including a mast pivotally mounted on said base; a support arm secured to said device; a pivotal support for said arm secured to said mast at a point remote from said base; means including a fluid actuated motor for moving said arm about said pivotal support; and cooperative means for tilting said mast relatively to said base to thereby move said device into garment pressing relationship with said breast plate and said shoulder support portion.

7. In combination in a garment pressing machine, a base; a post rigidly secured to and extending above said base; a breast plate secured to said post above said base and having upwardly and rearwardly extending shoulder support portions secured thereto along the upper portion thereof; a chest and shoulder pressing device; support means for said device including a mast pivotally mounted on said base; a support arm secured to said device; a pivotal support for said arm secured to said mast at a point remote from said base; means including a fluid actuated motor for moving said arm about said pivotal support; cooperative means for tilting said mast relatively to said base; and a cam plate secured to said motor and said mast for controlling the movement of said device.

8. In a pressing machine, the combination of a base, a support member mounted on said base and extending upwardly therefrom; a combined breast plate and shoulder support mounted on said member above said base; a mast pivotally mounted on said base; a support arm pivotally mounted on said mast; a pressing device carried by said arm; means for swinging said arm to different positions relatively to said mast; and means for tilting said mast relatively to said base to thereby move said pressing device into and out of pressing relation with said breast and shoulder support.

9. In a garment pressing machine a base; a support rigidly mounted on and extending above said base; a breast plate mounted on said support above and spaced from said base and having upwardly and rearwardly, curved shoulder support extensions secured thereto along the upper portion thereof; a combined chest and shoulder pressing device; a mast pivotally mounted on said base; a support arm for said device pivotally mounted on said mast; means for moving said device toward and away from said plate and said shoulder support extensions; and separate means for tilting said mast away from said breast plate and thereby moving the upper end thereof away from said support and thereby moving said device into and out of pressing relationship with said breast plate and said shoulder support extensions.

10. In a garment pressing machine, a base; a support member mounted on said base and projecting upwardly therefrom; a breast plate mounted on said member above said base; a pressing device movable toward and away from said plate; a support mechanism for said device including an upwardly extending mast pivotally secured to, and at a point above, said base, and a support arm pivotally mounted on said mast above and spaced from said base; means for swinging said arm to different positions relatively to said mast and a separate means for tilting said mast relatively to said base and said breast plate to thereby move said device into and out of pressing relationship with said plate.

11. In a garment pressing machine, a base; a support member mounted on said base and projecting upwardly therefrom; a breast plate mounted on said support member above and spaced from said base; a pressing device movable toward and away from said plate; a support mechanism for said device including an upwardly extending mast pivotally mounted on said base and a support arm pivotally mounted on said mast above and spaced from said base and at a point between the ends of said arm; a guide bar pivotally secured to said arm at a point remote from said device and the pivotal connection between said arm and said mast; and separate means for tilting said mast and for swinging said arm to different positions relatively to said mast and said plate to thereby move said device into and out of pressing relationship with said plate.

12. In a garment pressing machine a base; a vertically extending support member; a breast plate mounted on said member at a point above and spaced from said base; a pressing device movable toward and away from said beast plate; a support mechanism for said device including an upwardly extending mast pivotally mounted on said base and a support arm secured to said device and pivotally secured to said mast; a cam plate pivotally secured to said mast and operatively connected to said support member; a guide bar pivotally secured to said cam plate and said support arm at a point remote from said device and the pivotal connection between said arm and said mast; means for swinging said support arm about its pivotal connection with said mast and for moving said cam plate relatively to said support member and about its pivotal connection with said guide bar and with said mast; and separate means for tilting said mast relatively to said base and to said breast plate to thereby move said device into and out of pressing relationship with said breast plate.

13. A combination of elements as defined by claim 12 and including means for yieldingly limiting the tilting movement of said mast relatively to said base.

14. A combination of elements as defined in claim 12 and including adjustable means for limiting the movement of said arm relatively to said mast.

15. In a garment pressing machine, a base; a support member firmly mounted on said base; a combined breast plate and shoulder support mounted on said member above said base; a mast pivotally secured to said base at a point above said base and extending above said base; a support arm pivotally mounted on said mast at a point above and spaced from said base; a pressing device operatively secured to said arm; a cam plate pivotally secured to said mast and movably secured to said base; means for swinging said support arm and said cam plate about their pivotal supports on said mast; and separate means, including said cam plate, for swinging said mast toward and away from said support member and said combined breast plate and shoulder support, and for simultaneously moving said cam plate relatively to said support member to thereby move said device into and out of pressing relationship with said breast plate and shoulder support.

16. In a garment pressing machine, a base; a support member extending above and firmly mounted on said base; a combined breast plate and shoulder support rigidly mounted on said member above said base; a mast pivotally secured to said base and extending vertically above it; a support arm pivotally mounted on said mast at a point above and spaced from said base; a pressing device operatively secured to said arm; a cam plate pivotally mounted on said mast at a point intermediate said base and the pivotal support of said arm, and having a roller-engaging surface formed along edges thereof; a cam plate-engaging roller secured to said support member above said base; means for swinging said support arm about its pivotal support on said mast and toward and away from said breast plate and shoulder support and for simultaneously moving said cam plate relative to said roller; and separate means for moving said mast relatively to said base and said plate relatively to said roller to thereby move said device into and away from pressing relationship with said breast plate.

17. A garment pressing machine comprising a base; a support member mounted on said base; a breast plate mounted on said member; a mast tiltably mounted on and extending above said base; a support arm tiltably mounted on said mast at a point above and spaced from said base; a pressing device secured to and below said arm at a point remote from the point of support of said arm on said mast; a guide bar pivotally secured to said support arm at a point spaced from said device and the support for said arm on said mast; a cam plate tiltably secured to said mast intermediate said base and the point of support of said arm on said mast, said plate having spaced support-engaging edges formed thereon; spaced edge-engaging support devices secured to said support member above said base; a cylinder and rod assembly pivotally secured to said plate at a point spaced from the support-engaging edges thereof and pivotally secured to said support arm at a point intermediate the ends of said arm for swinging said arm and said plate relatively to said support member; separate pressure responsive means for tilting said mast relatively to said base and said support member; and means responsive to movements of said mast for controlling delivery of actuating pressure to said pressure-responsive means.

18. A garment pressing machine comprising a base; a support member mounted on and extending above said base; a breast plate mounted on said member above said base; a mast pivotally mounted on and extending above said base; a support arm pivotally mounted on said mast above said base; a pressing device secured to said arm; means for swinging said arm about its pivotal support on said mast to move said device toward and away from said breast plate; a cam plate pivotally mounted on said mast; plate-engaging and actuating means secured to said base; and separate means including said plate and said plate-actuating means for tilting said mast and moving said device into garment-pressing relationship with said breast plate.

19. A garment pressing machine comprising a base; a support member mounted on and extending above said base; a breast plate mounted on said member above said base; a mast supported on said base; a support arm pivotally mounted on said mast above said base; a pressing device secured to said arm; a roller-engaging cam plate pivotally mounted on said mast; a cam-plate-engaging roller secured to said base for engaging and shifting said cam plate relatively to said base; and means including said cam plate for actuating said support arm and moving said device into pressing relationship with said breast plate.

20. A garment pressing machine comprising a base; a vertically extending support member mounted on said base; a breast plate secured to said member and spaced above said base; a mast pivotally secured to said base and projecting upwardly therefrom; a support arm pivotally secured to said mast; a pressing device operatively secured to said arm; a cam plate pivotally secured to said mast and having at least one roller-engaging surface formed thereon; a cam-plate-engaging roller secured to said support member and located above said base and engaging said roller-engaging edge of said plate; means for swinging said support arm about its pivotal support on said mast; and separate means including said cam plate and said plate-engaging roller for swinging said support arm about its pivotal support on said mast and for moving said device toward and away from said breast plate; and means motivated by movements of said mast for moving said pressing device into pressing relationship with said breast plate.

21. In a garment pressing machine, a base; a support member mounted on said base; a breast plate mounted on said support member; a mast pivotally secured to said base and extending above said base; a support arm pivotally secured to said mast; a pressing device operatively secured to said arm; a cam plate pivotally secured to said mast and having support engaging edges formed thereon; a cam-plate-engaging projection secured to said support member and spaced from said base; pressure actuated means for swinging said support arm about its pivotal support on said mast; separate pressure actuated means for tilting said mast relatively to said base and said support member and for shifting said cam plate relatively to said support member and to said cam-plate-engaging projection, and for moving said pressing device toward and away from pressing relationship with said breast plate; and means actuated by movement of said mast for tilting said mast and moving said device into pressing relationship with said breast plate.

22. In a garment pressing machine, a base; a vertically extending support member mounted on said base; a combined breast and shoulder support plate mounted on said member at a point above and spaced from said base; a pressing device movable toward and away from said plate; a support mechanism for said device including a vertically extending mast pivotally secured to said base and a support arm pivotally secured to said mast; means for swinging said support arm to different positions relatively to said mast; and means responsive to a swinging movement of said support arm for tilting said mast to an inclined position relatively to said support member.

23. In a garment pressing machine, a combination of elements as defined in claim 22, including also means for heating said breast plate and said pressing device.

24. In a garment pressing machine, a base; a support member mounted on, and extending above said base; a breast plate mounted on said support member at a point spaced from said base; a pressing device movable toward and away from said breast plate; a support mechanism for said device including an upwardly extending mast pivotally mounted on said base; a support arm pivotally secured to said mast; an extension arm secured to said support arm and adjustable means for securing said device to said arm; presser-actuated means for swinging said support arm relatively to said mast; and separate means responsive to a swinging movement of said support arm for tilting said mast.

25. In a garment pressing machine, a base; a support member mounted on and extending vertically above said base; a breast plate mounted on said support member above and spaced from said base; a vertically extending mast pivotally secured to said base; a support arm pivotally secured to said mast above and spaced from said base; a pressing device operatively secured to said arm; a cam plate pivotally secured to said mast; cam plate-engaged rollers spaced from and secured to said base; pressure actuated means for swinging said support arm and said plate about their respective pivotal supports on said mast; and separate means, including said cam plate and pressure actuated means for tilting said mast.

26. In a garment pressing machine, a base; a support member mounted on and extending above said base; a combined breast and shoulder support plate mounted on said member above and spaced from said base; an upwardly extending mast secured to said base; spaced support plates for said mast secured to said mast and said base; a pivot support for said mast located between and supported by said support plates and located at one side of said mast; a support arm pivotally secured to said mast at a point above and spaced from said base and said pivot support for said mast; a pressing device operatively secured to said arm; means for swinging said support arm about its pivotal support on said mast; and means for tilting said mast about its pivotal support.

27. In a garment pressing machine, a base; a support member mounted on and extending above said base; a combined breast and shoulder support plate mounted on said member above and spaced from said base; an upwardly extending mast pivotally secured to said base; spaced support plates for said mast secured to said mast and said base and a pivot support for said mast located between and supported by said plates and located at one side of said mast; a support arm pivotally secured to said mast; a pressing device operatively secured to said support arm; a cam plate pivotally secured to said mast; cam plate-engaged rollers spaced from and rigidly secured to said base; means for swinging said support arm and said cam plate about their respective pivot supports on said mast; a guide bar extending between and pivotally connected to said cam plate and said support arm; and means for tilting said mast about its pivotal support.

28. In a garment pressing machine, a base; a support member secured to and extending above said base; a combined breast and shoulder support plate mounted on said member above said base; an upwardly extending mast supported on said base; a pivotal support for said mast secured to and located above and spaced from said base and located at one side of said mast; a support arm pivotally secured to said mast at a point above and spaced from the pivotal support for said mast; a pressing device operatively secured to said support arm; a cam plate pivotally secured to said mast at a point intermediate the ends of said mast; a cam plate-engaged roller rigidly secured to and spaced from said base; and means including said cam plate and pressure actuated means for separately tilting said mast.

29. A combination of elements as defined in claim 28 and including means for separately heating the pressing device and the combined breast and shoulder support plate.

References Cited in the file of this patent

UNITED STATES PATENTS

| | | |
|---|---|---|
| 2,086,900 | Dahler | July 13, 1937 |
| 2,118,031 | De Marco | May 24, 1938 |
| 2,343,289 | Forse | Mar. 4, 1944 |
| 2,483,812 | Davis et al. | Oct. 4, 1949 |
| 2,800,260 | Mutolese | July 23, 1957 |
| 2,875,929 | Langen et al. | Mar. 3, 1959 |
| 2,986,311 | Stiefel | May 30, 1961 |